Nov. 8, 1927.
H. A. DENMIRE
1,648,447
ATTACHMENT FOR TIRE MAKING MACHINES
Filed Jan. 25, 1926
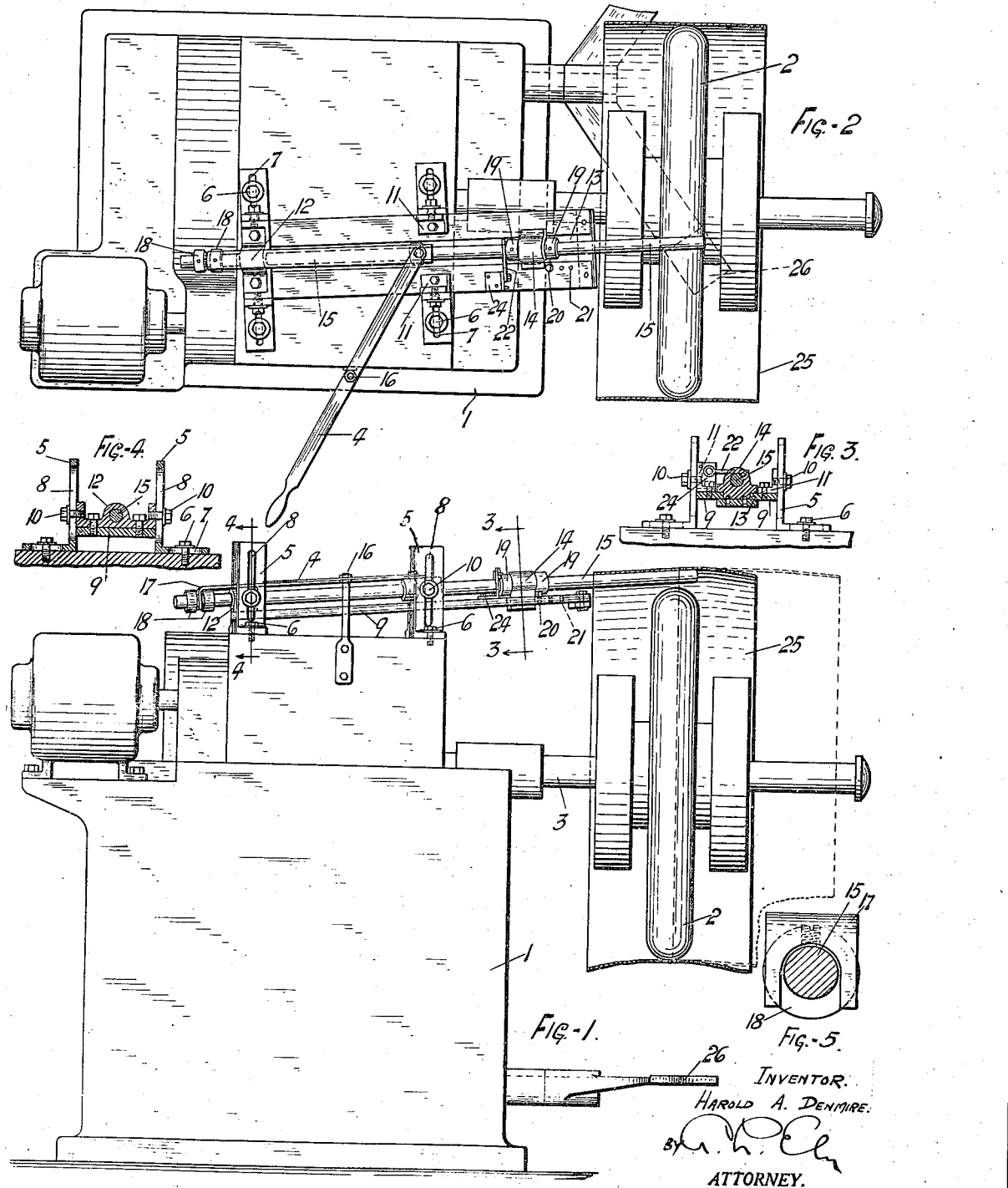
INVENTOR.
HAROLD A. DENMIRE.
BY
ATTORNEY.

Patented Nov. 8, 1927.

1,648,447

UNITED STATES PATENT OFFICE.

HAROLD A. DENMIRE, OF AKRON, OHIO, ASSIGNOR TO THE GENERAL TIRE AND RUBBER COMPANY, OF AKRON, OHIO, A CORPORATION OF OHIO.

ATTACHMENT FOR TIRE-MAKING MACHINES.

Application filed January 25, 1926. Serial No. 83,506.

The present invention relates to the art of manufacturing pneumatic automobile tires, and particularly to the placing of the fabric bands about the core upon which the tire is formed.

In the manufacture of pneumatic tires it is customary to form the cord fabric which constitutes the plies of the carcass into bands of a diameter somewhat less than the diameter of the core and to apply the bands by stretching them over the core, the construction of the bands imparting the desired stretch to the fabric. The operation of applying the bands has largely been done by hand and is quite a laborious one, especially in the manufacture of larger tires, for the band is required not only to be stretched over the core but to be properly centered therewith. The centering of the band, in addition to placing it about the core, is a tedious and time-consuming operation.

The present invention provides an attachment for use with and in combination with a rotating core such as found in all tire machines, and is designed to facilitate the placing of the band and the centering of it with respect to the core. The device shown is simple and inexpensive and may be combined with any standard tire making machine.

One embodiment of the invention is shown and described herein, but it will be apparent that other forms may be designed which come within the scope of the invention, as it is not limited to the specific construction of this application.

In the drawings:

Figure 1 is a side elevation of a tire making machine in combination with the improved fabric placing and centering device;

Figure 2 is a plan thereof;

Figure 3 is a section on the line 3—3 of Figure 1;

Figure 4 is a section on the line 4—4 of Figure 1; and

Figure 5 is a detail.

The tire machine is shown at 1 and the core at 2, the latter being carried upon a shaft 3 which, as usual in these machines, is adapted to be driven at slow speed for the application of the fabric and at fast speed for the shaping operations as is well known in the art.

Mounted upon the top of the machine are two pairs of brackets 5 which are parallel and at an angle oblique to the axis of the core, being secured to the top of the machine by bolts 6 which pass through slots 7 in the bases thereof so that the angular position of the brackets may be altered. These brackets are formed with vertical slots 8 and between the brackets is located a plate 9 which is secured in the brackets by bolts 10 passing through the vertical slots 8 and into lugs 11 secured on the plate. By means of the various adjustments described, the angular position of the plate relative to the axis of the core may be adjusted both horizontally and vertically. As shown, the proper adjustment for the purposes to be accomplished secures an upward and backward inclination, the plate pointing toward the core in the direction of its rotation and to a point above the core.

The end of the plate furthest removed from the core is provided with a bearing 12 formed on the plate, while the end nearest the core is provided with a slot 13 in which rides a movable bearing 14. The provision of the movable bearing at the location nearest the core prevents the accidental transfer of oil to the band. Mounted in the bearings 12 and 14 is a long, freely rotatable rod or shaft 15 which extends from the bearing 12 to a position over the core. The rod is movable longitudinally by means of a lever 4 pivoted on the tire machine at 16 and provided with a link extending rearwardly and formed with a depending yoke 17 which is secured between two collars 18 on the rear end of the shaft. Collars 19 are secured to the shaft 15 on either side of the movable bearing 14. A pin 20 received in one of a number of holes 21 furnishes a stop for limiting the forward movement of the shaft 15, and a pivoted latch 22 on a bracket 24 carried by the plate 9 may be swung down behind the bearing 14 to afford a temporary stop to prevent rearward movement of the shaft 15.

The operation of the device may be briefly described. The tire builder applies the edge or skirt of the band of fabric 25 to the core 2 at its lowermost point and passes the upper edge of the fabric over the projecting end of the shaft 15. He then starts the core in rotation through the operation of the control pedals 26. The inclination of the shaft 15 and its position relative to the core will elevate the fabric band from the core slightly and draw it inwardly, this operation being continued until the band of fabric is centered upon the core. The latch 22 is then released and the shaft 15 drawn backwardly away from the core by the lever 4 and the operator can proceed with the shaping of the fabric about the core.

The apparatus shown and described is simple and easy in operation. It can be readily attached to or combined with any form of tire making machine and will enable the operator to quickly and accurately center the band of fabric upon the core.

What is claimed is:

1. An apparatus for use in the manufacture of tires, comprising a rotatable core, a plate, adjustable supports for said plate so that it may be positioned at oblique angles to the plane of the core, a shaft slidably mounted in the plate, and means to project the shaft over the core.

2. An apparatus for shifting a band of fabric relative to a core, comprising a rotatable core, and a shaft projecting over the core and mounted at a fixed oblique angular relation with respect to the axis of the core, said shaft being adapted to elevate a portion of the band of fabric from the core and shift it laterally thereon.

3. An apparatus for shifting a band of fabric relative to a core, comprising a rotatable core, a shaft projecting over the core and mounted at a fixed oblique angular relation with respect to the axis of the core, said shaft being adapted to elevate a portion of the band of fabric from the core and shift it laterally thereon, and means to withdraw the shaft from the core.

4. An apparatus for shifting a band of fabric relative to a core, comprising a rotatable core, and a shaft movable longitudinally to a position over the core, the shaft being angularly arranged with respect to the axis of the core and directed in the direction of its rotation.

5. In an apparatus for the manufacture of tires, a tire machine and a rotatable core thereon, a guide plate, means for mounting the guide plate at an oblique angle to the plane of the core and directed outwardly therefrom, and a shaft slidable longitudinally in the plate to a position over the core.

6. In an apparatus for the manufacture of tires, a tire machine and a rotatable core thereon, brackets angularly adjustable upon the tire machine, a guide plate adjustable to various inclined positions in the brackets, and a shaft slidably mounted in the brackets and movable to a position over the core.

7. In an apparatus for positioning a band of fabric on a core in the manufacture of tires, a tire machine and a rotatable core thereon, aligned bearings upon the tire machine, and a shaft in the bearings and movable longitudinally to a position over the core, the shaft being directed at an oblique angle to the plane of the core.

8. In an apparatus for positioning a band of fabric on a core in the manufacture of tires, a tire machine and a rotatable core thereon, aligned bearings upon the tire machine, and a shaft in the bearings and movable longitudinally to a position over the core, the shaft being directed upwardly and at an oblique angle to the plane of the core.

9. In an apparatus for positioning a band of fabric on a core in the manufacture of tires, a tire machine and a rotatable core thereon, aligned bearings upon the tire machine, and a shaft in said bearings projecting over the core and directed at an oblique angle to the plane thereof.

10. In an apparatus for positioning a band of fabric on a core in the manufacture of tires, a tire machine and a rotatable core thereon, aligned bearings upon the tire machine, and a shaft in said bearings projecting over the core and directed upwardly and at an oblique angle to the plane thereof.

11. In an apparatus for positioning a band of fabric on a core in the manufacture of tires, a tire machine, a rotatable core thereon, a support upon the tire machine, and a shaft carried by the support and movable to a position over the core and directed at an oblique angle to the plane thereof.

12. In an apparatus for positioning a band of fabric on a core in the manufacture of tires, a tire machine, a rotatable core thereon, a support upon the tire machine, and a shaft carried by the support and movable to a position over the core and directed upwardly and at an oblique angle to the plane thereof.

13. In an apparatus for positioning a band of fabric on a core in the manufacture of tires, a tire machine and a rotatable core thereon, aligned bearings upon the tire machine, a longitudinally movable shaft in said bearings projecting over the core and directed at an oblique angle to the plane of the core, the outer of said bearings being movable with the shaft.

HAROLD A. DENMIRE.